(No Model.)
A. RAMAGE.
FOOT WARMER.
No. 306,956. Patented Oct. 21, 1884.
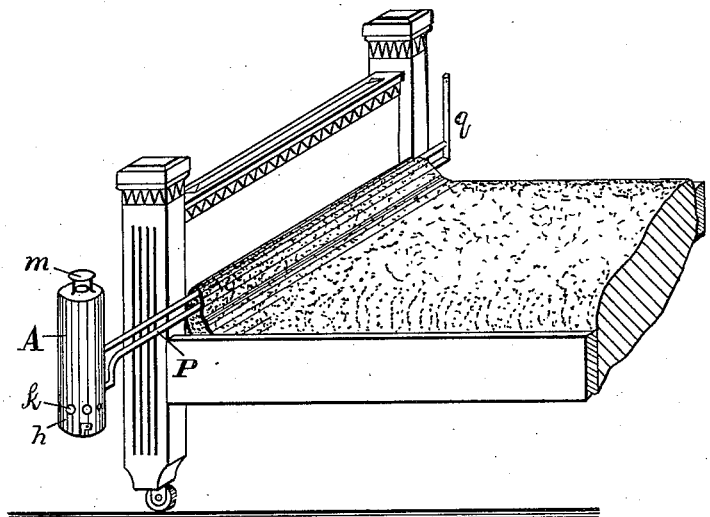
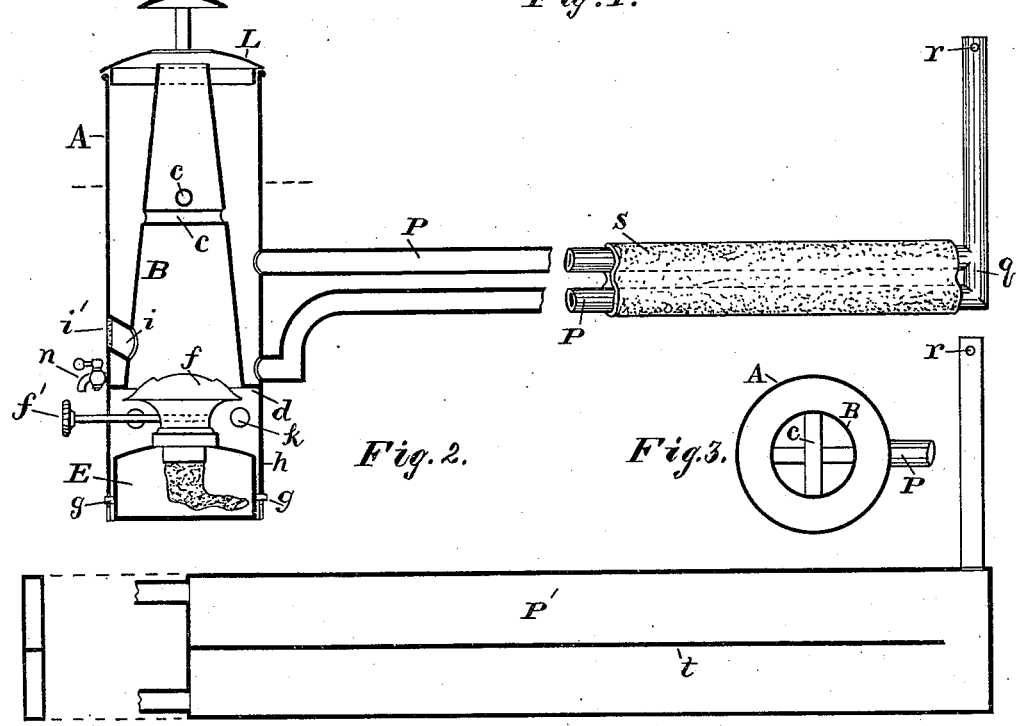
Witnesses:
A. C. Eader
Jno. E. Morris.
Inventor:
Alex. Ramage
By Chas. B. Mann
Attorney.

UNITED STATES PATENT OFFICE.

ALEXANDER RAMAGE, OF SPANISH BAR, COLORADO.

FOOT-WARMER.

SPECIFICATION forming part of Letters Patent No. 306,956, dated October 21, 1884.

Application filed November 2, 1883. (No model.)

*To all whom it may concern:*

Be it known that I, ALEXANDER RAMAGE, a citizen of the United States, residing at Spanish Bar, in the county of Clear Creek and State of Colorado, have invented certain new and useful Improvements in Foot-Warmers, of which the following is a specification.

My invention relates to a foot-warmer to be attached to a bedstead, invalid's chair, carriage, or car.

The invention is illustrated in the accompanying drawings, in which Figure 1 shows the application of the foot-warmer to a bedstead. Fig. 2 shows a partly sectional and partly side view. Fig. 3 is a horizontal section of the water-heater. Fig. 4 is a modification.

The letter A designates the water-heater, consisting of a metal cylinder standing upright, and having an open tapered tube, B, extending up through its center and made fast to the bottom $d$. The space between the tube and this inner wall of the cylinder comprises an annular receptacle for water. The tapered tube serves, as will hereinafter appear, as a flue or chimney for a lamp. Transverse tubes $c$ extend across the flue and open into the water-receptacle. Their position is such as to insure that they will have the full benefit of the heat of the lamp E, attached below the bottom $d$. The walls of the cylinder project downward below the receptacle-bottom $d$, and form a bottomless base-hood, $h$. The upper part of the base-hood wall is provided with air-draft holes $k$, to supply air for maintaining combustion, and in the lower part of said wall are right-angled slots, one end of which opens at the bottom edge of the said wall. The lamp E occupies the bottomless base-hood, and is placed therein by inserting it upward. The lamp has an ordinary oil-fount, with a burner, $f$, directly below the lower end of the flue B. The burner is provided with a wick-raiser, $f'$, the shaft of which projects through the base-hood wall. Projecting lugs or pins $g$ on the side of the oil-fount engage with the right-angled slots in the base-hood, and form a suitable means by which the lamp is attached and detached. It is desirable that while the lamp is in its position the flame may be regulated so as to be most effective in heating the transverse tubes $c$ in the flue. To this end it is necessary that provision be made for regulating the wick without removing the lamp. This is accomplished by passing the wick-raiser shaft $f'$ through the wall of the base-hood to the outer side. Furthermore, as the walls of the cylinder and flue are of metal, it is necessary to provide means whereby the flame can be seen. This is accomplished by placing a tube, $i$, through the water-receptacle just above the bottom $d$, so as to be in range with the flame of the burner, and making one end of the tube tight in the wall of the cylinder and the other end in the wall of the flue. To prevent the air from affecting the flame, the tube is closed by a glass, $i'$. By this position the tube serves for inspecting the flame of the lamp. A removable cover, L, is provided for the top of the annular water-heating receptacle. This cover has an opening in the center for the draft, and a cap, $m$, supported above the opening protects the opening from being accidentally closed. A small cock, $n$, is provided, by which the hot water may be drawn off for any purpose. Two horizontal tubes, P, are attached to and enter the water-heater at points one above the other, and extend horizontally also one above the other. The other ends of these tubes are connected by an upright tube, $q$, the upper end of which projects above the horizontal tubes as high as the top of the cylinder, and said upper end has an opening, $r$, for vent. The upright connecting-tube $q$, with its end projecting up, and having a vent, $r$, at the top, provides an outlet for air in the tubes when filling the apparatus with water, and yet prevents the escape of water. The tubes P, with ends connected, are for the circulation of the hot water in the water-heater, and these constitute the foot-warmer. The length of these tubes must be such as to suit for the special place which the foot-warmer is to occupy. In the present instance they extend across a bedstead on top of a mattress, and covered by the bed-clothes, as shown in Fig. 1. By the described arrangement of attaching the lamp to the water-cylinder the entire heater may be suspended, as shown, and there is no necessity for its base to rest directly on a support. When used for this purpose, the tubes should have a covering, $s$, made of flannel or cloth, as shown in Fig. 2.

If desired, instead of the tubes P, a horizontal sheet-metal case, P', may be used, like that in Fig. 4, which in practice is about four inches wide, one-quarter of an inch thick, and as long as may be required, divided in the center by a partition, t, extending lengthwise to within an inch of the outer end, where there is an upright vent-tube corresponding to the tube q.

The construction of this apparatus is such that no danger attends the use of the lamp. It is adapted for application to a bed or other place convenient for the feet of invalids, and is both cheap and efficient.

Prior to my invention a water-heating cylinder had been shown having a central flue, and provided with circulating-tubes whose ends were connected with the cylinder and heated by a lamp. No claim, therefore, is here made to such. My invention differs therefrom, in that it has a bottomless base-hood below the cylinder within and to which the lamp is attached, and has provision outside of the hood by which the lamp-flame may be regulated without removing the lamp; and it also differs from the old device referred to, and is an improvement thereon, in that provision is made whereby the flame can be seen at all times, thus enabling it to be properly regulated.

Having described my invention, I claim and desire to secure by Letters Patent of the United States—

1. A foot-warmer having an upright water-cylinder, A, provided with a bottom d, a central flue, B, open at both ends, and provided with transverse tubes c, opening through opposite sides of the flue into the water-cylinder, a bottomless base-hood, h, formed by the walls of the cylinder projecting below the said bottom d, and provided with air-holes k in the walls, and a lamp and burner occupying the base-hood, attached thereto by means substantially as described, and having its wick-raiser shaft f' projected through the base-hood wall, as set forth.

2. A foot-warmer having an upright water-cylinder, A, provided with a bottom, d, a central flue, B, open at both ends, and provided with transverse tubes c, opening through opposite sides of the flue into the water-cylinder, a lamp and burner attached by means substantially as described, and having its wick-raiser shaft f' projected outside, to enable the flame to be regulated without removing the lamp, and a tube, i, through the water-cylinder in range with the burner, and having one end secured in the cylinder-wall and the other in the flue-wall, as set forth.

In testimony whereof I affix my signature in presence of two witnesses.

ALEXANDER RAMAGE.

Witnesses:
J. S. DANFORD,
A. P. WILLIAMS.